US009622415B2

(12) United States Patent
Duquesne et al.

(10) Patent No.: US 9,622,415 B2
(45) Date of Patent: Apr. 18, 2017

(54) CLEANING SYSTEM FOR A COMBINE HARVESTER WITH AN ECCENTRIC SIEVE DRIVE

(71) Applicant: CNH Industrial America LLC, New Holland, PA (US)

(72) Inventors: Frank R. G. Duquesne, Zwevegem (BE); Bart G. L. Van Hullebusch, Knesselare (BE)

(73) Assignee: CNH Industrial America LLC, New Holland, PA (US)

( * ) Notice: Subject to any disclaimer, the term of this patent is extended or adjusted under 35 U.S.C. 154(b) by 60 days.

(21) Appl. No.: 14/688,649

(22) Filed: Apr. 16, 2015

(65) Prior Publication Data
US 2015/0296712 A1 Oct. 22, 2015

(30) Foreign Application Priority Data

Apr. 22, 2014 (BE) .................................. 2014/0283

(51) Int. Cl.
*A01F 12/32* (2006.01)
*B07B 1/00* (2006.01)
*A01F 12/44* (2006.01)

(52) U.S. Cl.
CPC ................................. *A01F 12/448* (2013.01)

(58) Field of Classification Search
CPC . A01D 75/282; A01D 41/1276; A01F 12/448; A01F 12/446; A01F 12/44; A01F 12/56; A01F 12/32
See application file for complete search history.

(56) References Cited

U.S. PATENT DOCUMENTS

| | | | | |
|---|---|---|---|---|
| 1,138,591 A | * | 5/1915 | Hawthorne | A01F 12/56 209/365.2 |
| 2,212,092 A | * | 8/1940 | Wood | A01F 12/44 460/92 |
| 2,893,558 A | * | 7/1959 | Zollinger | A01D 75/282 209/254 |

(Continued)

FOREIGN PATENT DOCUMENTS

| | | |
|---|---|---|
| AT | 386767 B | 10/1988 |
| DE | 500467 C | 6/1930 |

(Continued)

*Primary Examiner* — Árpád Fábián-Kovács
(74) *Attorney, Agent, or Firm* — Patrick M. Sheldrake

(57) ABSTRACT

A cleaning system for a harvester has a sieve that is moveable by a drive assembly that includes a rotary drive, —an eccentric device, a transmission connected to the eccentric device and to the sieve, which transmission cyclically varies the distance between the driving point of the eccentric device and the sieve coupling during each full rotation of the rotatable output shaft of the rotary drive, wherein, due to the cyclic variation of the distance between the driving point of the eccentric device and the sieve coupling, during each reciprocating sieve movement at least one of the accelerating portion of the throw stroke, the decelerating portion of the throw stroke, the accelerating portion of the return stroke and the decelerating portion of the return stroke has a duration that is different from the duration of at least one other of the portions of the reciprocating sieve movement.

11 Claims, 4 Drawing Sheets

(56) References Cited

U.S. PATENT DOCUMENTS

| | | | | |
|---|---|---|---|---|
| 4,598,718 | A | * | 7/1986 | Glaubitz .............. A01D 75/282 |
| | | | | 209/416 |
| 6,412,260 | B1 | | 7/2002 | Lukac et al. |
| 6,672,957 | B2 | | 1/2004 | Voss et al. |
| 7,553,226 | B2 | | 6/2009 | Dhont et al. |
| 2003/0186731 | A1 | * | 10/2003 | Voss ...................... A01F 12/448 |
| | | | | 460/101 |
| 2005/0282601 | A1 | * | 12/2005 | Duquesne ............. A01F 12/448 |
| | | | | 460/101 |
| 2006/0229119 | A1 | * | 10/2006 | Wamhof .............. A01D 75/282 |
| | | | | 460/101 |
| 2008/0318650 | A1 | * | 12/2008 | Dhont .................. A01D 75/282 |
| | | | | 460/101 |
| 2015/0305243 | A1 | * | 10/2015 | Duquesne ............... A01F 12/56 |
| | | | | 460/101 |
| 2015/0319931 | A1 | * | 11/2015 | Missotten .............. A01D 41/12 |
| | | | | 460/101 |

FOREIGN PATENT DOCUMENTS

| | | |
|---|---|---|
| DE | 9113652 U1 | 1/1992 |
| DE | 102009000797 A1 | 8/2010 |
| EP | 0590750 A1 | 4/1994 |
| EP | 2540647 A1 | 1/2013 |
| JP | 06022632 A * | 2/1994 |

\* cited by examiner

CLEANING SYSTEM FOR A COMBINE HARVESTER WITH AN ECCENTRIC SIEVE DRIVE

This application claims foreign priority under 35 U.S.C. §119 to Belgian Application BE2014/0283 filed Mar. 3, 2014 titled "Combine Harvester" and having Frank R. G. Duquesne and Bart Van Hullebusch as the inventors. The full disclosure of BE2014/0283 is hereby incorporated herein by reference.

The invention pertains to a combine harvester having a cleaning system for separating harvested seeds from by-products that are harvested along with said seeds.

Combine harvesters are widely used in the harvesting of various types of grain, corn and other crops of which the seed is harvested. Typically, a combine harvester comprises a cutter bar, which cuts the plants that contain the seeds to be harvested from the field. The thus harvested crop is threshed inside the combine harvester, in which process the seeds are separated from the other parts of the plants. The stalks of the harvested plants are removed from the combine harvester via a straw walker and a mixture of harvested seeds and by-products remains in the combine harvester. These by-products (e.g. chaff or "ears") are generally smaller than the stalks that are removed from the combine harvester via the straw walker.

The mixture of harvested seeds and these by-products is transported to a cleaning system, in which the threshed seeds are separated from the by-products. The cleaning system generally comprises one or more sieves, which perform a reciprocating movement during use. The sieved seeds are then collected and transported to the grain tank of the combine harvester, which is generally emptied periodically.

The sieve or sieves of the cleaning system are generally arranged at an angle relative to the horizontal, with the front end of the sieve (that is, the end closest to the cutter bar) lower than the rear end of the sieve. The reciprocating movement of the sieve makes that the seeds and by-products are thrown upwards and backwards by the sieve. A fan blows air over and through the sieve, to catch the lighter particles of the by-products and keep them airborne until they are blown out of the combine harvester.

It is known to arrange the sieves on rocker arms and to drive the sieves via an eccentric device in combination with a pitman arm. The eccentric device may comprise a crank or an eccentric disc. In known cleaning systems, the pitman arm has a fixed length.

The reciprocation sieve movement comprises a throw stroke and a return stroke. During the throw stroke, the sieve throws the harvested seeds and by-products up from the sieve. Generally, the sieve moves towards the back of the combine harvester during the throw stroke, in a direction opposite to the normal driving direction of the combine harvester.

The throw stroke comprises an accelerating portion and a decelerating portion. In known cleaning systems, the accelerating portion is the first half of the throw stroke and the decelerating portion is the second half of the throw stroke. The harvested seeds and by-products generally leave the surface of the sieve at or close to the end of the accelerating portion of the throw stroke.

During the return stroke, the sieve moves back from the end position of the throw stroke to the begin position of the throw stroke. Generally, the sieve moves towards the front of the combine harvester during the return stroke, in the direction of the normal driving direction of the combine harvester.

The return stroke comprises an accelerating portion and a decelerating portion. In known cleaning systems, the accelerating portion is the first half of the return stroke and the decelerating portion is the second half of the return stroke. The harvested seeds and by-products generally are airborne during most of the return stroke of the sieve. In an effective sieving process, they fall back onto sieve during the last part of the decelerating portion of the return stroke.

In this known arrangement, the accelerating portion of the throw stroke, the decelerating portion of the throw stroke, the accelerating portion of the return stroke and the decelerating portion of the return stroke all have the same duration. The sieve only effectively accelerates the harvested seeds and by-products during the accelerating portion of the throw stroke, so in the known arrangement during just 25% of the time.

SUMMARY OF THE INVENTION

It is the object of the invention to provide an improved cleaning system for a combine harvester.

In accordance with the invention, this object is achieved with a combine harvester, comprising a cleaning system for separating harvested seeds from by-products that are harvested along with said seeds, said cleaning system comprising at least one sieve, an associated sieve drive assembly and a sieve coupling, said sieve drive assembly being connected to the sieve by said sieve coupling, said sieve being moveable by said sieve drive assembly to perform a reciprocating sieve movement having a throw stroke and a return stroke, said throw stroke and said return stroke each having an accelerating portion and a decelerating portion, wherein the sieve drive assembly comprises:
  a rotary drive, which rotary drive comprises a rotatable output shaft having a center line,
  an eccentric device, which eccentric device is fixedly connected to the rotatable output shaft of the rotary drive to rotate with the rotatable shaft, which eccentric device has an eccentricity and a driving point, which driving point is rotatable around the center line of the rotatable shaft along a circular path having a radius that equals the eccentricity of the eccentric device,
  a transmission, which transmission has a first end that is connected to the eccentric device and a second end that is connected to the sieve coupling, which transmission is adapted to transfer the movement of the eccentric device to the sieve coupling and to cyclically vary the distance between the driving point of the eccentric device and the sieve coupling during each full rotation of the rotatable output shaft of the rotary drive, wherein, due to the cyclic variation of the distance between the driving point of the eccentric device and the sieve coupling, during each reciprocating sieve movement at least one of the accelerating portion of the throw stroke, the decelerating portion of the throw stroke, the accelerating portion of the return stroke and the decelerating portion of the return stroke has a duration that is different from the duration of at least one other of said portions of the reciprocating sieve movement.

So, in accordance with the invention, a single reciprocating sieve movement comprises an accelerating portion of the throw stroke, the subsequent decelerating portion of the throw stroke, the subsequent accelerating portion of the return stroke and the subsequent decelerating portion of the return stroke. In accordance with the invention, at least one of said accelerating portion of the throw stroke, said subsequent decelerating portion of the throw stroke, said subsequent accelerating portion of the return stroke and said subsequent decelerating portion of the return stroke has a duration that is different from at least one other of these portions of the reciprocating sieve movement. Therefore, in accordance with the invention, the ratio of the durations of the accelerating portion of the throw stroke, the decelerating portion of the throw stroke, the accelerating portion of the return stroke and the decelerating portion of the return stroke is different from 1:1:1:1.

Optionally, in a possible embodiment, the duration of the accelerating portion of the throw stroke is more than 25% of the duration of said reciprocating sieve movement, so of the throw stroke and the return stroke together.

In known devices, the distance between the driving point of the eccentric device and the sieve coupling is constant during normal operation of the sieve assembly. In some known sieve drive assemblies this distance may be adjustable, for example in order to adjust the length of the sieve stroke or the throwing angle, but even in these known drive assemblies the distance between the driving point of the eccentric device and the sieve coupling is constant during normal sieving operation. In these sieve drive assemblies, the accelerating portion of the throw stroke, the decelerating portion of the throw stroke, the accelerating portion of the return stroke and the decelerating portion of the return stroke all have the same duration. So, they all have a duration that is 25% of a reciprocating sieve movement.

In accordance with the invention, this distance is cyclically varied during each full rotation of the rotatable output shaft of the rotary drive, so during each reciprocation sieve movement. Each reciprocating sieve movement has a single throw stroke and a single return stroke. At the end of the return stroke, the distance between the driving point of the eccentric device and the sieve coupling is the same as it was at the start of the throw stroke directly preceding said return stroke.

This cyclic variation of the distance between the driving point of the eccentric device and the sieve coupling allows to achieve a difference in the duration of the accelerating portion of the throw stroke, the decelerating portion of the throw stroke, the accelerating portion of the return stroke and/or the decelerating portion of the return stroke during a single reciprocating sieve movement.

This difference in the duration of the different portions of the reciprocating sieve movement allows to optimize the sieving process and/or to increase the capacity of the of the sieves without having to enlarge the space the need within the combine harvester.

It has been found that good results can be achieved the duration of the accelerating portion of the throw stroke is more than 25% of the duration of the throw stroke and the return stroke together. In particular when harvesting grain or corn, this has shown to produce good results.

In this embodiment, in comparison with known arrangements, a larger proportion of the time is effectively used to accelerate the harvested seeds (e.g. grain, corn) and by-products in the sieving operation. As a consequence, a smaller proportion of the time is used to slow down the sieve after it reaches its maximum speed at the end of the accelerating portion of the throw stroke and to return the sieve to its initial position at the beginning of the throw stroke than in known arrangements. This increases the capacity of the cleaning system inside the combine.

Furthermore, this embodiment allows providing a higher acceleration of the seeds and by-products that are to be sieved, or a higher maximum velocity. This also increases the capacity of the cleaning system, as well as the effectiveness of the sieving process.

In a possible embodiment, the transmission comprises a cyclic length variation link assembly which has a length which is cyclically variable during each rotation of the rotatable output shaft.

The cyclic length variation link assembly may be realized in many different ways. In a possible embodiment, the cyclic length variation link assembly is or comprises an actuator, for example a hydraulic cylinder, an electric or magnetic actuator, a pneumatic actuator or a mechanical actuator such as a threaded spindle with a nut, of which the length is cyclically varied during each rotation of the rotatable output shaft and therewith during each reciprocating sieve movement.

In a different variant of the cyclic length variation link assembly, the cyclic length variation link assembly comprises a first length variation link element and a second length variation link element which are pivotably connected to each other. The relative angle between the first length variation link element and the second length variation link element is cyclically variable to cyclically vary the length of the cyclic length variation link assembly.

Optionally, in this variant, a length variation drive mechanism is provided that engages the first length variation link element and/or the second length variation link element to cyclically vary the relative angle between the first length variation link element and the second length variation link element during each rotation of the rotatable output shaft.

In a possible embodiment, the cyclic length variation link assembly has a first end and a second end, which first end pivotably engages the eccentric device and which second end is pivotably connected to the sieve via the sieve coupling.

In a possible embodiment, the eccentric device comprises a circular disc that is fixedly connected at a shaft connection point to the rotatable output shaft of the rotary drive to rotate with the rotatable shaft. The shaft connection point is located at a distance from the center of the circular disc. The center of the circular disc is the driving point of the eccentric device and the distance between the center of the circular disc and the connection point equals the eccentricity (e) of the eccentric device.

Optionally, in this embodiment, the transmission comprises a link having an annular member. This annular member extends around the circular disc and is pivotable around said circular disc.

In a possible embodiment, the eccentric device comprises a crank that is connected to the rotatable output shaft of the rotary drive to rotate with the rotatable shaft. The crank further comprises a pivot connector which is adapted to pivotably connect the crank to the transmission.

In a specific embodiment, the transmission comprises a cyclic length variation link assembly which has a length which is cyclically variable during each rotation of the rotatable output shaft. In this embodiment, the cyclic length variation link assembly comprises a first length variation link element and a second length variation link element which are pivotably connected to each other. The relative angle between the first length variation link element and the second length variation link element is cyclically variable to cyclically vary the length of the cyclic length variation link assembly.

In this specific embodiment, the transmission comprises a length variation drive mechanism that engages the first length variation link element and/or the second length variation link element to cyclically vary the relative angle between the first length variation link element and the second length variation link element during each rotation of the rotatable output shaft.

In this specific embodiment, the length variation drive mechanism comprises:
- an eccentric length variation drive device, which eccentric length variation drive device is connected to a rotatable shaft to rotate with said rotatable shaft, which eccentric length variation drive device has an eccentricity and a driving point, which driving point is rotatable around the center line of said rotatable shaft along a circular path having a radius that equals the eccentricity of the eccentric length variation drive device,
- a length variation drive linkage, which length variation drive linkage has a first end that is connected to the eccentric length variation drive device and a second end that is connected to the cyclic length variation link assembly of the transmission.

In a variant of this specific embodiment, the eccentric length variation drive device comprises a circular disc that is connected to the rotatable shaft to rotate with the rotatable shaft at a shaft connection point, which shaft connection point is located at a distance from the center of the circular disc. The center of the circular disc is the driving point of the eccentric length variation drive device and the distance between the center of the circular disc and the shaft connection point equals the eccentricity of the eccentric length variation device.

In a further variant of this specific embodiment, the rotatable shaft to which the eccentric length variation drive device is connected is the rotatable output shaft of the rotary drive of the sieve drive assembly.

In a possible embodiment, the transmission comprises a pitman arm, and said pitman arm comprises the cyclic length variation link assembly.

The invention further pertains to a method for separating harvested seed from by-products in a combine harvester, which method comprises the following steps:
- providing a combine harvester according to the invention,
- rotating the rotatable output shaft around its center line, therewith rotating the eccentric device and also rotating the driving point of the eccentric device around the center line of the rotatable output shaft along a circular path having a radius that equals the eccentricity of the eccentric device,
- transferring the movement of the eccentric device to the sieve coupling,
- making, during each reciprocating sieve movement, the duration of at least one of the accelerating portion of the throw stroke, the decelerating portion of the throw stroke, the accelerating portion of the return stroke and the decelerating portion of the return stroke different from the duration of at least one other of said portions of the reciprocating sieve movement by cyclically varying the distance between the driving point of the eccentric device and the sieve coupling during each full rotation of the rotatable output shaft of the rotary drive.

In a possible embodiment of the method according to the invention, the step of cyclically varying the distance between the driving point of the eccentric device and the sieve coupling during each full rotation of the rotatable output shaft of the rotary drive makes the duration of the accelerating portion of the throw stroke more than 25% of the duration of the throw stroke and the return stroke together.

In a possible embodiment of the method according to the invention, a combine harvester is provided in which the transmission comprises a cyclic length variation link assembly which has a length which is cyclically variable during each rotation of the rotatable output shaft. In this embodiment of the method, the length of the cyclic length variation link assembly is cyclically varied during each rotation of the rotatable output shaft.

BRIEF DESCRIPTION OF THE DRAWINGS

The invention will be described in more detail below under reference to the drawing, in which in a non-limiting manner exemplary embodiments of the invention will be shown.

The drawing shows in.

DETAILED DESCRIPTION OF THE PREFERRED EMBODIMENT

Figure 1:
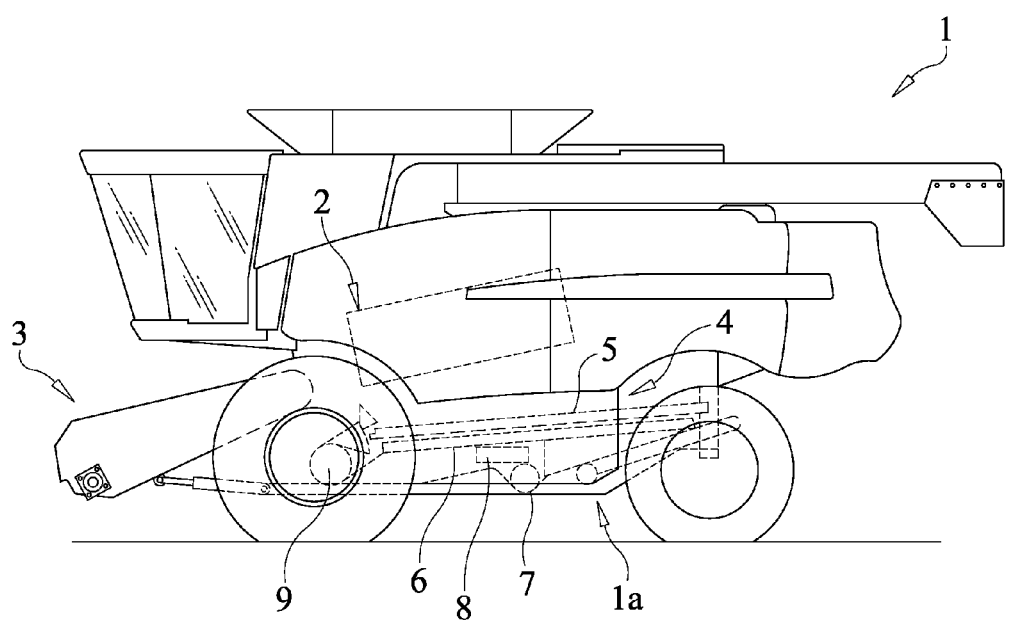
FIG. 1: an agricultural combine harvester

FIG. 1 shows a conventional agricultural combine harvester 1 having a combine harvester chassis 1a. The combine harvester 1 generally includes a thresher 2 operable for receiving crop material from a harvesting mechanism 3 on a front end of the combine harvester 1. The thresher 2 separates smaller grains, seeds, pods and related plant material from larger stalks, stems, leaves, husks and other elements of the crop material, as well as vines, weeds and the like which may be present in the harvested crop material. The smaller material falls from thresher 2 and is conveyed to a cleaning system 4. The smaller material is a mixture of seeds (e.g. grain, corn) and by-products.

In the embodiment of FIG. 1, the cleaning system 4 comprises multiple sieves. However, simpler embodiments, where just a single sieve is present are possible as well.

The cleaning system 4 of FIG. 1 includes an upper, relatively coarse sieve 5. This coarse sieve 5 receives the mixture of seeds and by-products from the thresher 2. Furthermore, a lower, relatively fine sieve 6 is provided. This fine sieve 6 receives seeds such as grain or corn which pass through the coarse sieve 5. Sieves 5, 6, separate the seed from the remaining by-products of other material, such as pod fragments and the like. The seed is collected below the sieves 5, 6, where an auger 7 is provided that conveys the clean seeds to an elevator, which in turn conveys the clean seeds upwardly to a grain tank.

The sieves 5, 6 are reciprocated to perform a reciprocating sieve movement by a sieve drive assembly 8 for facilitating sifting of the crop material therethrough. The reciprocating sieve movement also transports the material onto the sieve towards the rear of the combine harvester 1 by throwing the material upwards and backwards.

Material which does not pass through the sieves 5,6 is moved rearwardly on the coarse sieve 5 or the fine sieve 6 by reciprocal sieve movement. Particles that don't pass through the upper sieve 5 drop from the rear end of the sieves 5 through an opening in the rear of combine 1. Particles that do get through the upper sieve 5 but not through the lower sieve 6 are rethreshed. Optionally, a fan 9 is provided that blows a stream of air over the sieves 5, to catch the lighter particles of the by-products and keep them airborne until they blown out of the combine harvester 1.

Figure 2:
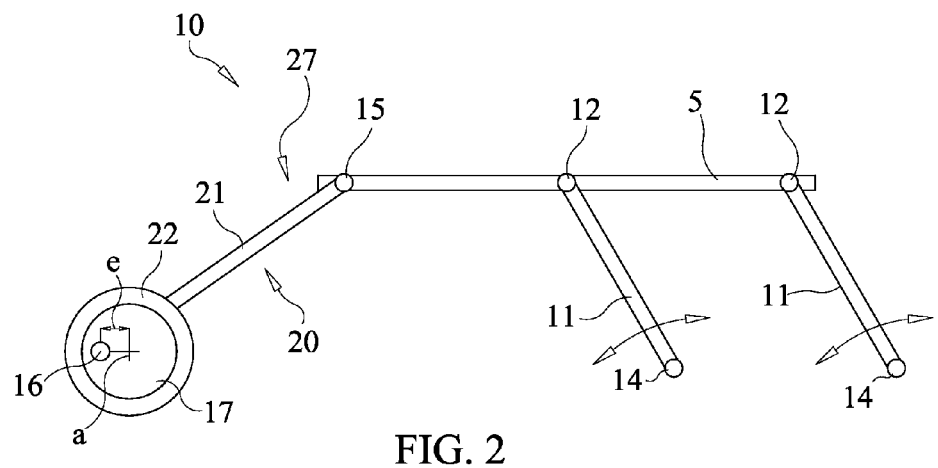
FIG. 2: schematically, a sieve and a sieve drive assembly as known from the prior art.

FIG. 2 shows schematically a sieve 5 with a sieve drive assembly 10 as is known from the prior art. The sieve drive assembly 10 is connected to the sieve 5 by sieve coupling 15.

The sieve 5 is mounted onto two rocker arms 11. The rocker arms 11 are connected to the sieve 5 by pivots 12. The rocker arms 11 are connected to the chassis of the combine harvester by pivots 14.

The sieve drive assembly 10 comprises a rotary drive that has a rotatable output shaft 16. The rotatable output shaft 16 is fixedly connected to an eccentric device that comprises a circular disc 17. The rotatable output shaft 16 is fixedly connected to the circular disc 17 at a distance from the center of the eccentric disc 17. This distance e is the eccentricity e of the eccentric device.

When the rotatable output shaft 16 is rotated by the rotary drive, the circular disc 17 rotates along with the rotatable output shaft 16. The center of the circular disc 17 then rotates around the center line of the rotatable shaft 16 along a circular path having a radius that equals the eccentricity e of the eccentric device. Therewith the center of the circular disc 17 is the driving point a of the eccentric device.

The sieve drive assembly 10 further comprises a transmission 20. In the embodiment shown in FIG. 2, the transmission comprises a link 21 in the form of a pitman arm 27. The link 21 is provided with an annular member 22, which extends around the circular disc 17. The annular member 22 is fixed relative to the rest of the link 21, but is pivotable relative to the circular disc 17.

When the rotatable output shaft 16 is rotated by the rotary drive, the circular disc 17 rotates along with the rotatable output shaft 16. The movement of the circular disc 17 around the center line of the rotatable shaft 16 is transferred to the sieve coupling 15 via the transmission 20. The transmission 20 transforms the rotation of the circular disc 17 around the center line of the rotatable shaft 16 into a reciprocating movement of the sieve 5 on the rocker arms 11.

Figure 3:
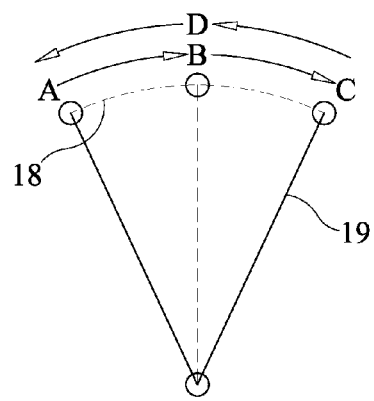
FIG. 3: schematically, the reciprocating sieve movement.

FIG. 3 shows schematically the reciprocating sieve movement. Due to the sieve 5 being mounted on the two rocker arms 11, the reciprocating sieve movement is a part of a circular arc 18, with the distance of pivot 12 to pivot 14 as a radius 19. This circular arc 18 and radius 19 are shown in FIG. 3.

The reciprocating sieve movement comprises a throw stroke and a return stroke. The throw stroke is the movement from point A to point C (via point B) as indicated in FIG. 3. The return stroke is the movement from point C back to point A (via point D) as indicated in FIG. 3. Point B and point D are on the same location on the circular arc 18.

The throw stroke has an accelerating portion and a decelerating portion. The accelerating portion is from point A to point B as indicated in FIG. 3. At point A, the velocity of the sieve is zero, while at point B the sieve reaches its maximum velocity. From point B to point C, the sieve slows down again to zero velocity at point C. So, the part of the reciprocating sieve movement from point B to point C is the decelerating portion of the throw stroke.

The mixture of seed (such as grain or corn) and by-products is accelerated by the sieve in the accelerating portion of the throw stroke (from point A to point B). Due the their inertia, they leave the surface of the sieve when the sieve decelerates in the decelerating portion of the throw stroke.

The return stroke also has an accelerating portion and a decelerating portion. The accelerating portion is from point C to point D as indicated in FIG. 3. At point C, the velocity of the sieve is zero, while at point B the sieve reaches its maximum velocity. From point D to point A, the sieve slows down again to zero velocity at point A. So, the part of the reciprocating sieve movement from point D to point A is the decelerating portion of the throw stroke.

The seeds and by-products fall back onto the surface of the sieve at some point during the decelerating portion of the throw stroke, the accelerating portion of the return stroke or the decelerating portion of the return stroke. Ideally, the seeds and by-products fall back onto the surface of the sieve when the sieve is close to the end of the decelerating portion of the return stroke.

In known arrangements, the duration of the movement from point A to point B (which is the accelerating portion of the throw stroke), the duration of the movement from point B to point C (which is the decelerating portion of the throw stroke), the duration of the movement from point C to point D (which is the accelerating portion of the return stroke) and the duration of the movement from point D to point A (which is the decelerating portion of the return stroke) are all the same. Each one of the accelerating portion of the throw stroke, the decelerating portion of the throw stroke, the accelerating portion of the return stroke and decelerating portion of the return stroke takes up 25% of the duration of a single reciprocating sieve movement. This is the situation shown in FIG. 3.

In accordance with the invention, a different situation occurs. Due to the cyclic variation of the distance between the driving point of the eccentric device and the sieve coupling during each full rotation of the rotatable output shaft of the rotary drive, the duration of the movement from point A to point B (which is the accelerating portion of the throw stroke), the duration of the movement from point B to point C (which is the decelerating portion of the throw stroke), the duration of the movement from point C to point D (which is the accelerating portion of the return stroke) and the duration of the movement from point D to point A (which is the decelerating portion of the return stroke) are no longer the same.

For example, in accordance with the invention, the duration of the accelerating portion of the throw stroke could be 40% of the duration of a single reciprocating sieve movement, and the duration of the decelerating portion of the throw stroke, the duration of the accelerating portion of the return stroke and the duration of the decelerating portion of the return stroke could each be 20% of the duration of said reciprocating sieve movement.

In accordance with the invention, it is possible that the points B and D are at different locations on the circular arc between the points A and C than shown in FIG. 3. So, points B and D may be located at a point that is not halfway the arc between the points A and C. Alternatively or in addition, points B and D may be at different locations on the circular arc, for example, the distance from point A to point B being larger than the distance from point D to point A.

Figure 4:
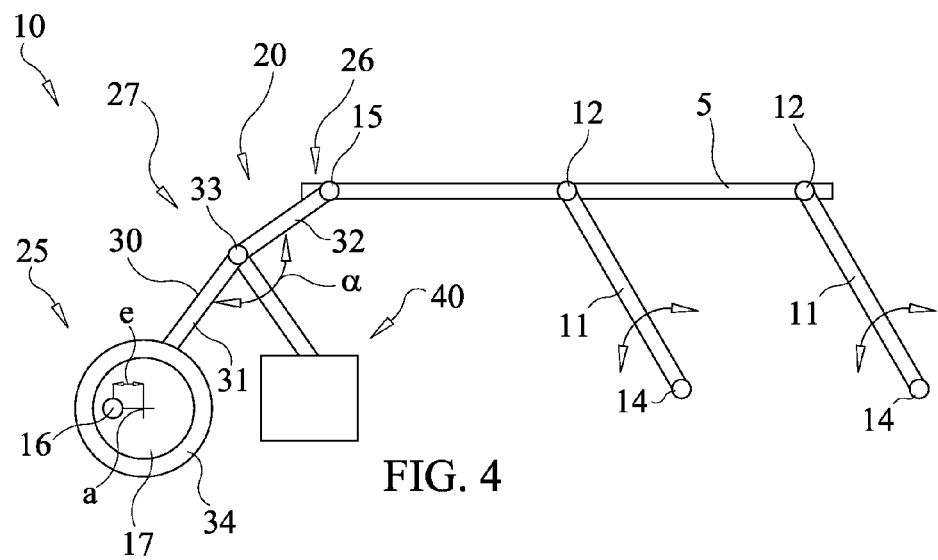
FIG. 4: schematically, a first embodiment of a cleaning system according to the invention.

FIG. 4 schematically shows a first embodiment of a cleaning system according to the invention. In this embodiment, the sieve drive assembly 10 is connected to the sieve 5 by sieve coupling 15.

The sieve 5 is mounted onto two rocker arms 11. The rocker arms 11 are connected to the sieve 5 by pivots 12. The rocker arms 11 are connected to the chassis of the combine harvester by pivots 14.

The sieve drive assembly 10 comprises a rotary drive that has a rotatable output shaft 16. The rotatable output shaft 16 is fixedly connected to an eccentric device that comprises a circular disc 17. The rotatable output shaft 16 is fixedly connected to the circular disc 17 at a distance from the center of the eccentric disc 17. This distance is the eccentricity e of the eccentric device.

When the rotatable output shaft 16 is rotated by the rotary drive, the circular disc 17 rotates along with the rotatable output shaft 16. The center of the circular disc 17 then rotates around the center line of the rotatable shaft 16 along a circular path having a radius that equals the eccentricity e of the eccentric device. Therewith the center of the circular disc 17 is the driving point of the eccentric device.

The sieve drive assembly 10 further comprises a transmission 20. The transmission 20 has a first end 25 that is connected to the eccentric device and a second end 26 that is connected to the sieve coupling 15.

In accordance with the invention, the transmission 20 is adapted to transfer the movement of the eccentric device (here: the circular disc 17 that is mounted on the rotatable output shaft 16) to the sieve coupling 15 and to cyclically vary the distance between the driving point a of the eccentric device (which in this embodiment is the center of the circular disc 17) and the sieve coupling 15 during each full rotation of the rotatable output shaft 16 of the rotary drive.

In the embodiment of FIG. 4, the transmission comprises a cyclic length variation link assembly 30. This cyclic length variation link assembly 30 is a link in the transmission 20 and has a length which is cyclically variable during each rotation of the rotatable output shaft. In this embodiment, the cyclic length variation link assembly 30 is arranged in the pitman arm 27 of the transmission 20.

The cyclic length variation link assembly 30 has a first end, which coincides with the first end 25 of the transmission 20. The cyclic length variation link assembly 30 further has a second end, which coincides with the second end 26 of the transmission 20. The first end of the cyclic length variation link assembly 30 pivotably engages the eccentric device and the second end of the cyclic length variation link assembly 30 is pivotably connected to the sieve 5 via the sieve coupling 15.

The cyclic length variation link assembly 30 comprises a first length variation link element 31 and a second length variation link element 32 which are pivotably connected to each other by pivot 33.

The first length variation link element 31 comprises an annular member 34, which extends around circular disc 17 and is pivotable relative to this circular disc 17. The annular member 34 is fixedly connected to the rest of the first length variation link element 31.

In the embodiment of FIG. 4, the relative angle a between the first length variation link element 31 and the second length variation link element 32 is cyclically variable to cyclically vary the distance between the first end of cyclic length variation link assembly 30 and the second end of the cyclic length variation link assembly 30, and therewith the length of the cyclic length variation link assembly 30 as a whole.

In the embodiment of FIG. 4, the transmission 20 is provided with a length variation drive mechanism 40. The length variation drive mechanism 40 controls the cyclic length variation of the cyclic length variation link assembly 30.

In the embodiment of FIG. 4, the length variation drive mechanism 40 engages the first length variation link element 31 and the second length variation link element 32 via the pivot 33 that connects them, to cyclically vary the relative angle between the first length variation link element 31 and the second length variation link element 32 during each rotation of the rotatable output shaft 16.

Figure 5:
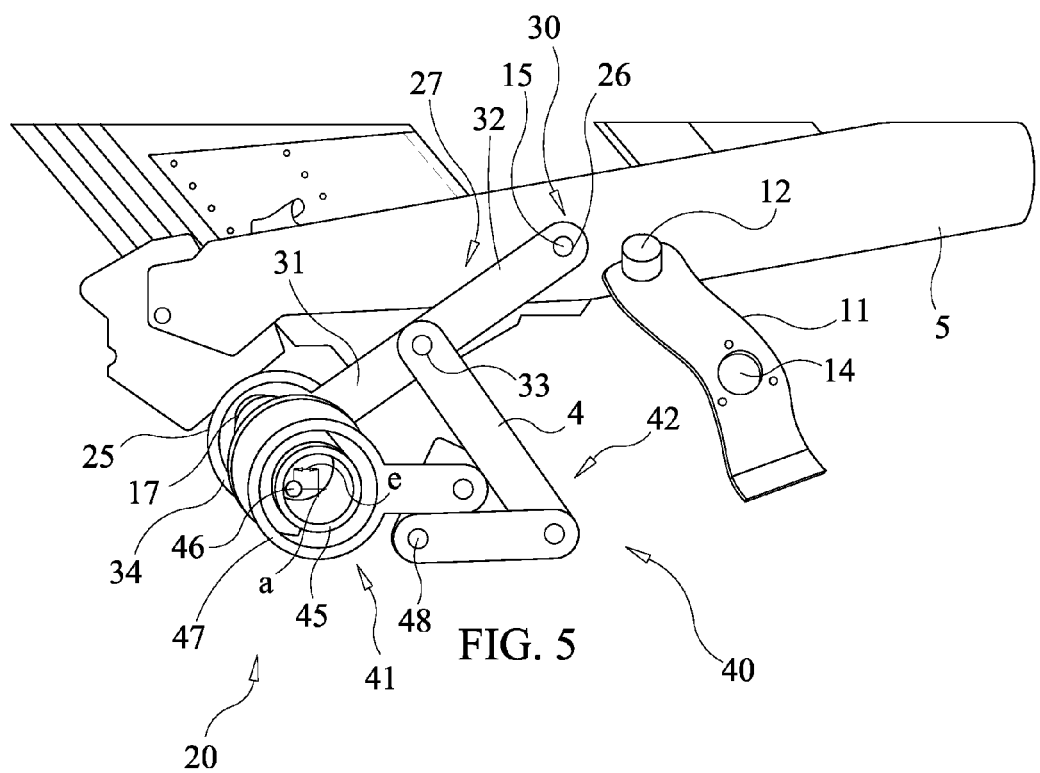
FIG. 5: a variant of the cleaning system as shown in FIG. 4,
FIG. 6: a graphic representation of an example of the velocity profile of the sieve that can be obtained by the embodiments shown in FIG. 4 and FIG. 5,
FIG. 7: schematically, the reciprocating sieve movement that goes with the velocity profile of FIG. 6.

FIG. 5 shows a variant of the cleaning system as shown in FIG. 4.

In the embodiment of FIG. 5, like in the embodiment of FIG. 4, the transmission comprises a cyclic length variation link assembly 30. This cyclic length variation link assembly 30 is a link in the transmission 20 and has a length which is cyclically variable during each rotation of the rotatable output shaft. In this embodiment, the cyclic length variation link assembly 30 is arranged in the pitman arm 27 of the transmission 20.

The cyclic length variation link assembly 30 has a first end, which coincides with the first end 25 of the transmission 20. The cyclic length variation link assembly 30 further has a second end, which coincides with the second end 26 of the transmission 20. The first end of the cyclic length variation link assembly 30 pivotably engages the eccentric device and the second end of the cyclic length variation link assembly 30 is pivotably connected to the sieve 5 via the sieve coupling 15.

The cyclic length variation link assembly 30 comprises a first length variation link element 31 and a second length variation link element 32 which are pivotably connected to each other by pivot 33.

The first length variation link element 31 comprises an annular member 34, which extends around circular disc 17 and is pivotable relative to this circular disc 17. The annular member 34 is fixedly connected to the rest of the first length variation link element 31.

The relative angle a between the first length variation link element 31 and the second length variation link element 32 is cyclically variable to cyclically vary the distance between the first end of cyclic length variation link assembly 30 and the second end of the cyclic length variation link assembly 30, and therewith the length of the cyclic length variation link assembly 30 as a whole.

In the embodiment of FIG. 5, the transmission 20 is provided with a length variation drive mechanism 40. The length variation drive mechanism 40 controls the cyclic length variation of the cyclic length variation link assembly 30.

In this embodiment, the length variation drive mechanism 40 comprises an eccentric length variation drive device 41 and a length variation drive linkage 42.

The eccentric length variation drive device 41 comprises a circular disc 45 that is fixedly connected to a rotatable shaft 46 at a shaft connection point, which shaft connection point is located at a distance from the center of circular disc 45. The circular disc 45 rotates with the rotatable shaft 46. The center of the circular disc 45 is the driving point a of the eccentric length variation drive device 41 and the distance between the center of the circular disc 45 and the connection point equals the eccentricity e of the eccentric length variation drive device 41.

The length variation drive linkage 42 has a first end that is connected to the eccentric length variation drive device 41 and a second end the is connected to the cyclic length variation link assembly 30 of the transmission 20.

In the embodiment of FIG. 5, the length variation drive linkage 42 comprises multiple links that are pivotably connected to each other. The length variation drive linkage 42 comprises one link that is provided with an annular member 47, which extends around circular disc 45 and is pivotable relative to this circular disc 45. The annular member 47 is fixedly connected to the rest of the link of which it forms a part. In the embodiment of the linkage shown in FIG. 5, the pivot 48 is fixed to the chassis of the combine harvester.

In the embodiment of FIG. 5, the length variation drive linkage 42 engages the first length variation link element 31 and the second length variation link element 32 via the pivot 33 that connects them, to cyclically vary the relative angle between the first length variation link element 31 and the second length variation link element 32 during each rotation of the rotatable output shaft 16.

Optionally, the rotatable shaft 46 to which the eccentric length variation drive device 40 is connected, is the rotatable output shaft 16 of the rotary drive of the sieve drive assembly, in particular an extension of this rotatable output shaft 16 of the rotary drive of the sieve drive assembly.

Figure 6:
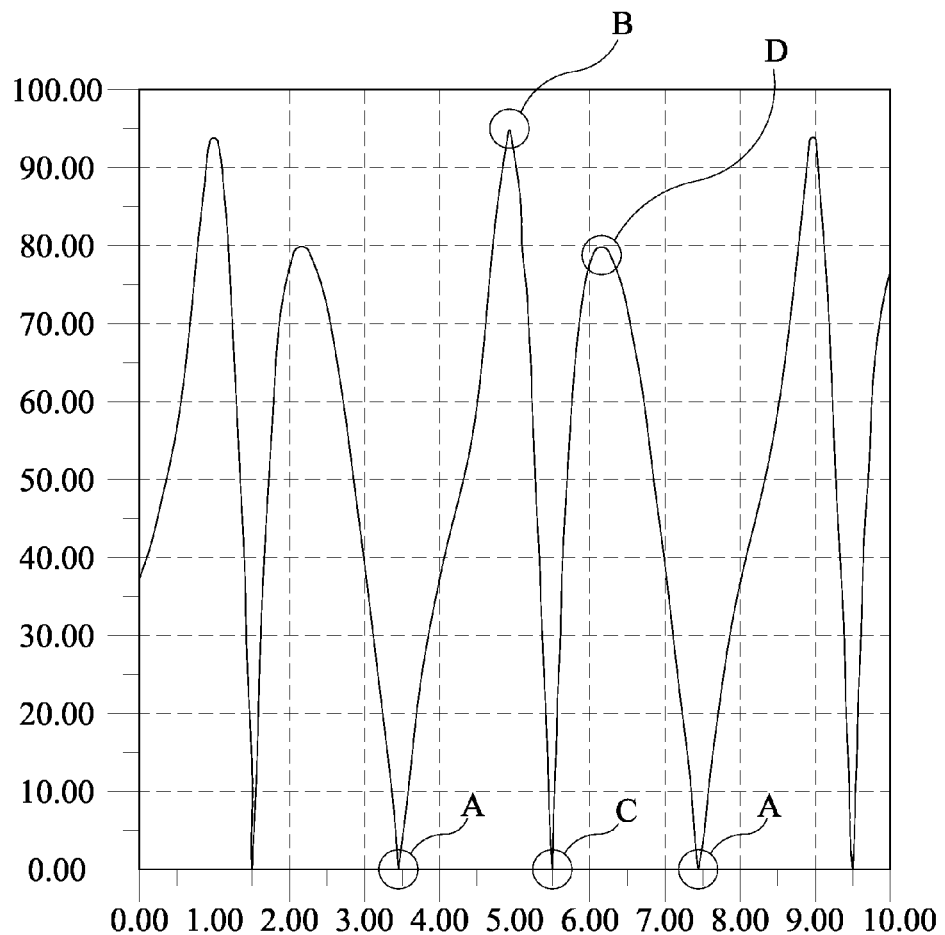

FIG. 6 shows a graphic representation of an example of the velocity profile of the sieve 5 that can be obtained by the embodiments shown in FIG. 4 and FIG. 5. In this graph, the vertical axis represents the velocity and the horizontal axis represents the time.

Figure 7:
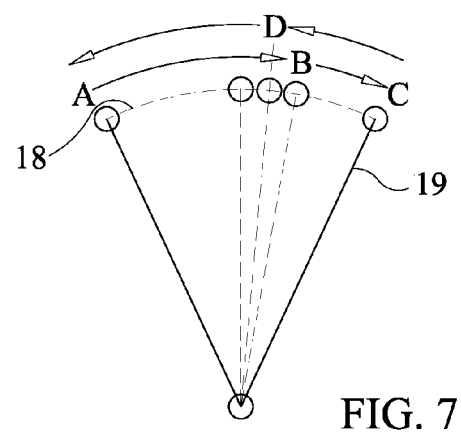

FIG. 7 shows schematically the reciprocating sieve movement that goes with this velocity profile.

FIG. 6 indicates which maximum or minimum speed correlated with which of the points of the reciprocating sieve movement as shown in FIG. 7. Point A is the end of the decelerating portion of the return stroke and the start of the accelerating portion of the throw stroke. Point B is the end of the accelerating portion of the throw stroke and the start of the decelerating portion of the throw stroke. Point C is the end of the decelerating portion of the throw stroke and the start of the accelerating portion of the return stroke. Point D is the end of the accelerating portion of the return stroke and the start of the decelerating portion of the return stroke.

FIG. 6 shows that a single reciprocating sieve movement, which consists of a single full throw stroke and a single full return stroke, has a duration of 4 time units on the horizontal axis.

In FIG. 6, the accelerating portion of the throw stroke (from point A to point B) has a duration of 1.5 time units on the horizontal axis. The decelerating portion of the throw stroke (from point B to point C) has a duration of 0.5 time units on the horizontal axis. The accelerating portion of the return stroke (from point C to point D) has a duration of 0.75 time units on the horizontal axis. The decelerating portion of the return stroke (from point D to point A) has a duration of 1.25 time units on the horizontal axis.

In FIG. 7 it is shown that with this velocity profile (unlike the known situation shown in FIG. 3), the points B and D are at different locations on the circular arc between the points A and C than shown in FIG. 3. Points B and D are both located at a point that is not halfway the arc between the points A and C. Furthermore, points B and D are at mutually different locations on the circular arc, with the distance from point A to point B being larger than the distance from point D to point A.

So, in this embodiment, all four portions of the reciprocating sieve movement have a different duration, and the duration of the accelerating portion of the throw stroke is more than 25% of the duration of the single reciprocation sieve movement as a whole.

The invention claimed is:

1. A combine harvester comprising:
a cleaning system comprising at least one sieve, an associated sieve drive assembly and a sieve coupling, said sieve drive assembly connected to the sieve by said sieve coupling, said sieve coupling defining a sieve pivot point between said sieve and said sieve drive assembly,
wherein said sieve is moveable by said sieve drive assembly to perform a reciprocating sieve movement having a throw stroke and a return stroke, said throw stroke and said return stroke each having an accelerating portion and a decelerating portion,
wherein the sieve drive assembly comprises:
a rotary drive comprising a rotatable output shaft having a center line;
an eccentric device fixedly connected to the rotatable output shaft of the rotary drive to rotate with the rotatable shaft, wherein the eccentric device has an eccentricity and a driving point, the driving point is rotatable around the center line of the rotatable shaft along a circular path having a radius that equals the eccentricity of the eccentric device; and
a transmission coupled between the eccentric device and the sieve coupling, the transmission is adapted to transfer the movement of the eccentric device to the sieve coupling and to cyclically vary the distance between the driving point of the eccentric device and the sieve coupling during each full rotation of the rotatable output shaft of the rotary drive, the transmission including a first length variation link element and a second length variation link element pivotally coupled to the first length variation link element at a common pivot point, the first length variation link element extending between a first end coupled to the eccentric device and a second end coupled to the second length variation link element at the common pivot point, the second length variation link element extending between a third end coupled to the first length variation link element at the common pivot point and a fourth end pivotably coupled to the sieve at the sieve pivot point defined by the sieve coupling such that the second length variation link element pivots relative to the sieve about the sieve pivot point,
wherein, due to the cyclic variation of the distance between the driving point of the eccentric device and the sieve coupling, during each reciprocating sieve movement at least one of the accelerating portion of the throw stroke, the decelerating portion of the throw stroke, the accelerating portion of the return stroke or the decelerating portion of the return stroke has a duration that is different from the duration of at least one other of said portions of the reciprocating sieve movement.

2. A combine harvester according to claim 1, wherein the duration of the accelerating portion of the throw stroke is more than 25% of the duration of said reciprocation sieve movement.

3. A combine harvester according to claim 1,
wherein a relative angle between the first length variation link element and the second length variation link element is cyclically variable to cyclically vary the distance between the driving point of the eccentric device and the sieve coupling.

4. A combine harvester according to claim 3, wherein the transmission further comprises a length variation drive mechanism that engages at least one of the first length variation link element, the second length variation link element or the common pivot point defined between the first length variation link element and the second length variation link element to cyclically vary the relative angle between the first length variation link element and the second length variation link element during each rotation of the rotatable output shaft.

5. A combine harvester according to claim 1, wherein the eccentric device comprises a circular disc that is fixedly connected at a shaft connection point to the rotatable output shaft of the rotary drive to rotate with the rotatable output shaft, the shaft connection point is located at a distance from the center of the circular disc, wherein the center of the circular disc is the driving point of the eccentric device and the distance between the center of the circular disc and the connection point equals the eccentricity of the eccentric device.

6. A combine harvester according to claim 5, wherein the transmission further comprises a link having an annular member, the annular member extends around the circular disc and is pivotable around said circular disc.

7. A combine harvester according to claim 1, wherein the eccentric device comprises a crank connected to the rotatable output shaft of the rotary drive to rotate with the rotatable shaft, the crank further comprises a pivot connector adapted to pivotably connect the crank to the transmission.

8. A combine harvester according to claim 1, wherein a relative angle between the first length variation link element and the second length variation link element is cyclically variable to cyclically vary the distance between the driving point of the eccentric device and the sieve coupling,
 wherein the transmission further comprises a length variation drive mechanism that engages at least one of the first length variation link element or the second length variation link element to cyclically vary the relative angle between the first length variation link element and the second length variation link element during each rotation of the rotatable output shaft,
 wherein the length variation drive mechanism comprises:
  an eccentric length variation drive device coupled for rotation with said rotatable shaft, the eccentric length variation drive device having an eccentricity and a length variation driving point, the length variation driving point being rotatable around the center line of said rotatable shaft along a circular path having a radius that equals the eccentricity of the eccentric length variation drive device; and
  a length variation drive linkage comprising a first end that is connected to the eccentric length variation drive device and a second end that is connected to at last one of the first length variation link element, the second length variation link element or the common pivot point defined between first length variation link element and the second length variation link element.

9. A combine harvester according to claim 8, wherein the eccentric length variation drive device comprises a circular disc that is connected to the rotatable shaft to rotate with the rotatable shaft at a shaft connection point, the shaft connection point is located at a distance from the center of circular disc, in which the center of the circular disc is the length variation driving point of the eccentric length variation drive device and a distance between the center of the circular disc and the shaft connection point equals the eccentricity of the eccentric length variation drive device.

10. A method for cleaning harvested crop using a cleaning system comprising at least one sieve, an associated sieve drive assembly and a sieve coupling, said sieve drive assembly connected to the sieve by said sieve coupling, in a combine harvester, said sieve coupling defining a sieve pivot point between said sieve and said sieve drive assembly, wherein said sieve is moveable by said sieve drive assembly to perform a reciprocating sieve movement having a throw stroke and a return stroke, said throw stroke and said return stroke each having an accelerating portion and a decelerating portion, which method comprises the following steps:
 rotating a rotatable output shaft of a rotary drive of the sieve drive assembly around a center line of the shaft, the rotary drive comprising a rotatable output shaft having a center line, an eccentric device fixedly connected to the rotatable output shaft of the rotary drive to rotate with the rotatable shaft, wherein the eccentric device has an eccentricity and a driving point, the driving point is rotatable around the center line of the rotatable shaft along a circular path having a radius that equals the eccentricity of the eccentric device, a transmission coupled between the eccentric device and the sieve coupling, the transmission is adapted to transfer the movement of the eccentric device to the sieve coupling and to cyclically vary the distance between the driving point of the eccentric device and the sieve coupling during each full rotation of the rotatable output shaft of the rotary drive, the transmission including first length variation link element and a second length variation link element pivotally coupled to the first length variation link element at a common pivot point, the first length variation link element extending between a first end coupled to the eccentric device and a second end coupled to second length variation link element at the common pivot point, the second length variation link element extending between a third end coupled to the first length variation link element at the common pivot point and a fourth end pivotably coupled to the sieve at the sieve pivot point defined by the sieve coupling such that the second length variation link element pivots relative to the sieve about the sieve pivot point,
 transferring the movement of the eccentric device to the sieve coupling via the transmission such that the duration of at least one of the accelerating portion of the throw stroke, the decelerating portion of the throw stroke, the accelerating portion of the return stroke or the decelerating portion of the return stroke differs from the duration of at least one other of said portions of the reciprocating sieve movement by cyclically varying the distance between the driving point of the eccentric device and the sieve coupling during each full rotation of the rotatable output shaft of the rotary drive.

11. A method according to claim 10, wherein cyclically varying the distance between the driving point of the eccentric device and the sieve coupling during each full rotation of the rotatable output shaft of the rotary drive results in the duration of the accelerating portion of the throw stroke being more than 25% of the duration of the throw stroke and the return stroke together.

* * * * *